United States Patent
Patel et al.

(10) Patent No.: US 10,455,264 B2
(45) Date of Patent: Oct. 22, 2019

(54) BULK DATA EXTRACTION SYSTEM

(71) Applicant: salesforce.com, inc., San Francisco, CA (US)

(72) Inventors: Yogesh Patel, Dublin, CA (US); Mahalaxmi Sanathkumar, San Francisco, CA (US); Shaahin Mehdinezhad Rushan, Dublin, CA (US); Bhaves Patel, Pittsburg, CA (US); Shreedhar Sundaram, Mateo, CA (US); Rajkumar Pellakuru, San Jose, CA (US); William Edward Hackett, Vallejo, CA (US)

(73) Assignee: salesforce.com, inc., San Francisco, CA (US)

( * ) Notice: Subject to any disclaimer, the term of this patent is extended or adjusted under 35 U.S.C. 154(b) by 94 days.

(21) Appl. No.: 15/885,065

(22) Filed: Jan. 31, 2018

(65) Prior Publication Data
US 2019/0238918 A1 Aug. 1, 2019

(51) Int. Cl.
H04N 21/262 (2011.01)
H04N 21/654 (2011.01)
H04L 29/08 (2006.01)

(52) U.S. Cl.
CPC ... *H04N 21/26291* (2013.01); *H04L 67/1097* (2013.01); *H04L 67/26* (2013.01); *H04N 21/654* (2013.01)

(58) Field of Classification Search
CPC H04N 21/654; H04N 21/26291; H04L 67/26; H04L 67/1097
See application file for complete search history.

(56) References Cited

U.S. PATENT DOCUMENTS

2004/0237094 A1* 11/2004 Vambenepe ........... G06Q 10/06
    719/328
2017/0116303 A1* 4/2017 Kolli .................. G06F 21/6227

OTHER PUBLICATIONS

Salesforce, Force.com Streaming API Developer Guide. Version 38.0. Dec. 2016. 85 pages. (Year: 2016).*
Salesforce, Bulk API Developer Guide. Version 38.0. Dec. 9, 2016. 112 pages. (Year: 2016).*
Salesforce, Force.com Streaming API Developer Guide, Version 41.0, Winter '18, 77 pages.
Transmission Control Protocol, DARPA Internet Program, Protocol Specification, RFC: 793, Information Sciences Institute, University of Southern California, Sep. 1981, 90 pages.

* cited by examiner

*Primary Examiner* — John M Macilwinen
(74) *Attorney, Agent, or Firm* — Meyertons, Hood, Kivlin, Kowert & Goetzel, P.C.

(57) ABSTRACT

Techniques are disclosed relating to bulk data extraction systems. In some embodiments, a streaming server system may receive a first request, from a data storage system, that is sent prior to initiation of a bulk data extraction for a first group of users. In response to the first request, the streaming server system may receive, from the data storage system, a first notification message that includes a particular event identifier for a most recent data event generated at the data storage system. The streaming server system may receive, from the data storage system, those messages associated with the bulk data extraction for the first group. Subsequent to completion of the bulk data extraction, the streaming server system may send, to the data storage system, a request to subscribe to notification messages for data events associated with the first group.

20 Claims, 12 Drawing Sheets

*Message 400*

```
{
    "group_ID":"114B"
    "data":{
        "event":{
            "created_date": "2018-01-15"
            "event_ID": 751
            "sequence_number": 195
        },
        "payload": "event details"
    },
    "channel": "topic/TestTopic"
}
```

*FIG. 4*

BULK DATA EXTRACTION SYSTEM

The present application is related to U.S. application Ser. No. 15/884,946 entitled "Verification of Streaming Message Sequence", which is filed concurrently herewith and incorporated by reference in its entirety.

BACKGROUND

Technical Field

This disclosure relates generally to data streaming systems, and more specifically to verifying the sequence of messages sent via data streaming systems.

Description of the Related Art

A data storage system may provide computing resources to various groups of users. For example, a data storage system may be accessible to, and be configured to manage data for, users associated with the various groups. In various instances, a user or software application may generate a data event for data managed by the data storage system, e.g., by creating or modifying a database record. In some such instances, it may be desirable for a client to be notified of data events associated with a particular group of users that match one or more criteria.

In various instances, a data storage system may be configured to provide notification messages according to a publish/subscribe model, in which a client may specify one or more criteria for data events. When a data event then occurs that matches at least one of the criteria, the data storage system may send a notification message for the data event to the client. In various instances, it may be desirable for the client to receive notification messages for data events in the order in which the data events occurred.

BRIEF DESCRIPTION OF THE DRAWINGS

FIG. 4 depicts an example notification message, according to some embodiments.

DETAILED DESCRIPTION

In various instances, a data storage system may be configured to monitor data events associated with various groups of users. Further, the data storage system may be configured to provide notification messages to one or more systems in response data messages meeting one or more criteria. As provided below, the present disclosure generally describes various aspects associated with such data storage system. A first set of embodiments described with reference to FIGS. 1-7 discloses systems and methods for verifying the sequence of notification messages corresponding to data events. A second set of embodiments described with reference to FIGS. 8-11 discloses systems and methods for obtaining an event identifier prior to the initiation of a bulk data extraction.

Figure 1:
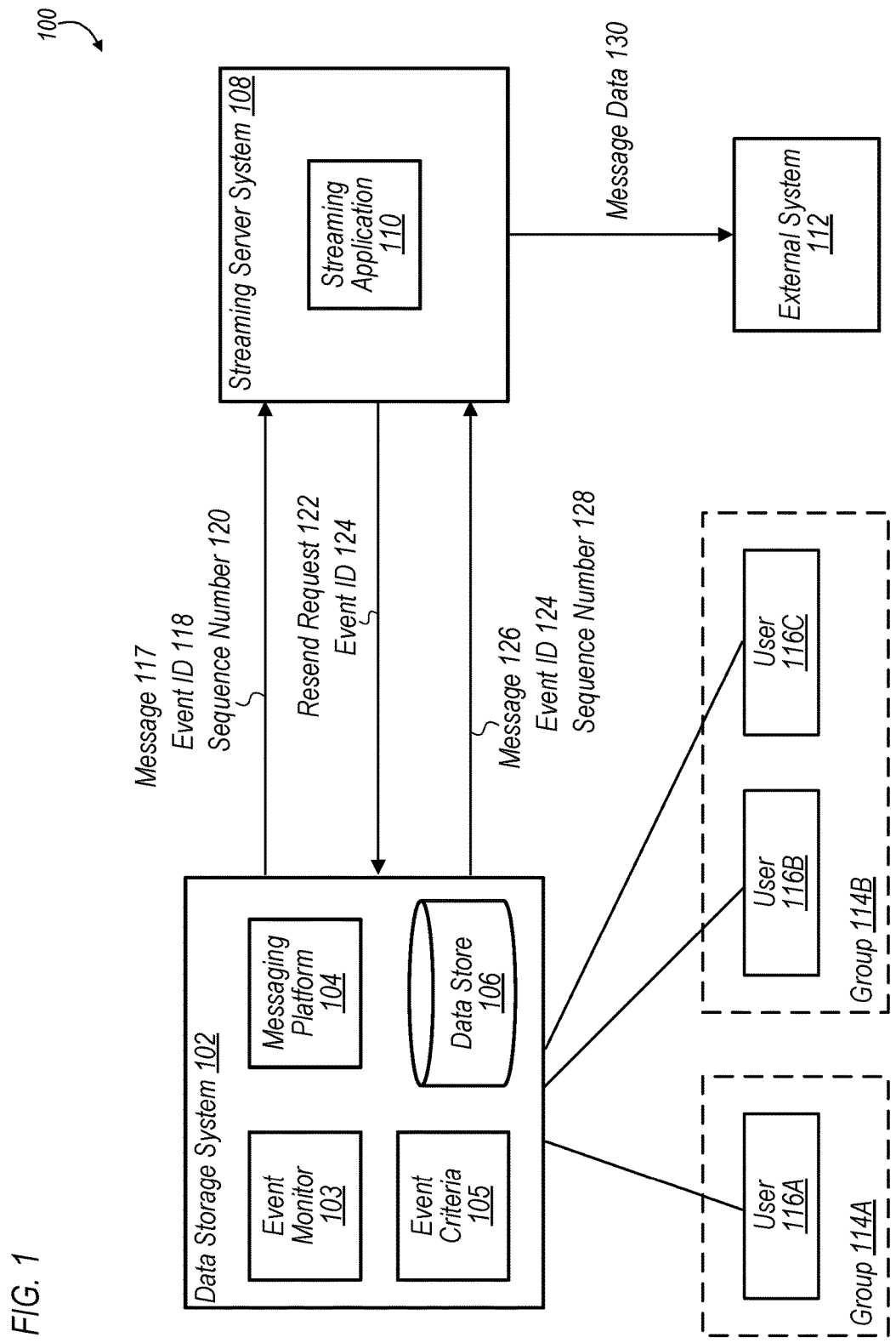
FIG. 1 is a block diagram illustrating an example system, according to some embodiments.

Referring to FIG. 1, a block diagram illustrating an example system 100 is depicted. In FIG. 1, system 100 includes data storage system 102, streaming server system 108, external system 112, and users 116. Note that, although shown in direct connection, one or more of data storage system 102, streaming server system 108, external system 112, or users 116 may be connected via one or more communication networks (not shown for clarity).

In various embodiments, data storage system 102 may be configured to provide computing resources to various groups of users 116. As shown in FIG. 1, given users 116 are associated with particular groups 114 for which data storage system 102 provides computing resources. For example, in some embodiments, data storage system 102 may be (or be included in) a multi-tenant computer system that provides computing resources for a plurality of tenants, each of which may include any suitable number of users. In one such embodiment, group 114A may correspond to a first tenant of the multi-tenant computer system, and group 114B may correspond to a second tenant of the multi-tenant computer system.

In the illustrated embodiment, data storage system 102 includes event monitor 103, messaging platform 104, event criteria 105, and data store 106. In some embodiments, data storage system 102 may include, or manage data used by, one or more application servers (not shown) configured to host software applications for the various groups 114. In implementing the software applications, data storage system 102 may be configured to store data to, and read data from, data store 106. For example, data store 106 may include one or more databases configured to store data for the various groups 114 and users 116.

In various embodiments, users 116 or software applications may generate various data "events" by manipulating one or more items of data stored by data store 106. For example, in some embodiments, such events may include the creation, deletion, or modification of a database record stored by data store 106. Users 116 may generate events, for example, by using one or more software applications provided by data storage system 102 to manipulate data stored by data store 106.

As shown in FIG. 1, data storage system 102 includes event monitor 103. In various embodiments, event monitor 103 may be operable to monitor various data events that occur at data storage system 102. For example, event monitor 103 may be configured to monitor data events for the data associated with groups 114 that is stored in data store 106. As it monitors these various events, event monitor 103 may be configured to assign each of the events an event identifier value, which refers to the position of a given event within the stream of events that occur at data storage system 102 during a given time period.

In some instances, it may be desirable to notify one or more users or entities, such as external system 112, of data events that match certain criteria. In various embodiments, data storage system 102 may be configured to provide notification messages (or simply "messages") according to a publish/subscribe model, in which data storage system 102 provides "push" notification messages to one or more clients (e.g., users 116, external system 112, etc.) in response to an event matching predetermined criteria. For example, in various embodiments, a client (e.g., one of users 116 or external system 112) may define a "channel" of events for which to receive notification messages by specifying criteria for those events (e.g., as a SQL query). In such embodiments, the client may then "subscribe" to that channel (using any suitable techniques, e.g., a combination of the Bayeux protocol and CometD) to receive notification messages whenever an event is generated that meets one or more of the specified criteria. For example, when a data event occurs, event monitor 103 may be configured to then evaluate that event by comparing it to various criteria specified in event criteria 105. In such embodiments, when the data event meets one or more of the criteria specified for a particular group (e.g., group 114A), messaging platform 104 may be configured to send a notification message, such as message 117, for this event to streaming application 110 executing on streaming server system 108.

After receiving the messages from data storage system 102, streaming application may be configured to provide these messages to the appropriate external system or users based on the group 114 associated with the data event. That is, streaming application 110 may receive notification messages corresponding to various groups 114, and may then send those messages to external systems authorized by, or otherwise associated with, the respective groups 114. For example, in some embodiments, streaming application 110 may provide one or more messages to a particular group 114 by sending message data 130 corresponding to those messages to an external system 112 associated with the particular group. In other embodiments, however, streaming application 110 may provide one or more messages to a particular group 114 by storing data corresponding to the set of messages in a message queue (not separately shown in FIG. 1 for clarity) accessible to an external system 112 associated with the particular group 114. Note that, in some embodiments, streaming server system 108 may be a dedicated computer system configured to host streaming application 110. In other embodiments, however, streaming server system 108 may correspond to one or more computer systems at a data center facility on which streaming application 110 may be executed—for example, as a virtual machine instance.

Such notification messages may be advantageous in various situations. For example, in one particular embodiment, external system 112 may be a data analytics system (e.g., SALESFORCE IQ) that analyzes data for a group of users (e.g., users 116B and 116C of group 114B) to generate insightful information that may be used to augment other software applications. For example, in an embodiment in which user 116B is a salesperson that uses computing resources provided by data storage system 102, data store 106 may store various items of information associated with user 116B, such as client lists, client communications, calendar entries, sales records, etc. In one embodiment, group 114B may opt to use external system 112 to analyze the data in data store 106 associated with user 116B to generate information that may be used to augment one or more software applications used by user 116B (e.g., generate a list of suggested tasks based on correspondence with a potential client). Thus, in such embodiments, it may be desirable to provide external system 112 with notification messages specifying the details of data events that match certain criteria. Note, however, that this particular embodiment is provided merely as an example and is not intended to limit the scope of this disclosure. In other embodiments, external system 112 may be any other suitable type of system to which notification messages may be sent.

Although only two groups 114 are shown in FIG. 1 for clarity, data storage system 102 may, in various embodiments, provide computing resources for numerous (e.g., 1,000 or more) groups 114, each of which may have numerous associated users 116. In such an embodiment, many data events for the various groups 114 may be generated, any of which may meet criteria specified in event criteria 105 and trigger a notification message to be sent. Accordingly, in such embodiments, many messages may be sent from data storage system 102 to streaming application 110 for various groups 114.

To provide a robust notification system, it may be desirable to verify that each of the messages sent by data storage system 102 is received by streaming application 110, in some embodiments. In some instances, however, various messages, or portions of messages, may be lost during transmission from data storage system 102 to streaming server system 108, e.g., due to data packages being dropped by intervening network components, etc. Additionally, in some embodiments, it may be desirable for external system 112 to receive the messages from data storage system 102 in the order that they were sent. In fact, for some sequence-driven applications, a particular external system 112 may require that it receives notification messages for data events in the order in which the data events occurred. For example, in the above-described example in which external system 112 performs data analytics on user 116B's data, external system 112 may, in some embodiments, be required to receive and analyze data corresponding to earlier events before receiving and analyzing data corresponding to subsequent events in order to properly generate insightful data. In some instances, however, one or more messages may be delayed or otherwise disrupted such that streaming application 110 receives those one or more messages out of their intended order.

The systems and methods disclosed herein may enable streaming application 110 to verify that it receives each of the messages sent by data storage system 102, and to verify that the messages it receives are in the order in which they were sent by data storage system 102. For example, as shown in FIG. 1, data storage system 102 may be configured to send message 117 to streaming application 110 executing on streaming server system 108. For example, user 116B may generate a data event (e.g., delete a database record) that satisfies specified criteria for a channel to which external system 112 is subscribed. This event may trigger data storage system 102 to send message 117 to streaming application 110, so that message 117 may then be provided to external system 112. Message 117 of FIG. 1 includes an event identifier 118. As noted above, event monitor 103 may be configured to assign each of the events an event identifier value. As explained in more detail below with reference to FIG. 2A, when the event that triggers message 117 occurs, event monitor 103 may assign to it an event identifier 118, which refers to the position of that event within the stream of events at data storage system 102.

Message 117 further includes a sequence number 120. As explained in more detail below with reference to FIG. 2A, sequence number 120 may, in various embodiments, be a group-specific sequence number that is incremented for every event that matches specified criteria associated with a particular group (e.g., group 114B) during a given time period. In some embodiments, the group-specific sequence number 120 may be generated based on a monotonically-increasing function, for example.

In various embodiments, streaming application 110 may be configured to verify the sequence of the messages received from data storage system 102 prior to providing the messages to external system 112. For example, as described with reference to FIG. 3, streaming application 110 may be configured to detect, based on sequence number 120 included in message 117, that a particular message for a particular group (e.g., group 114B) sent by data storage system 102 before message 117 has not been received. In response to detecting that the particular message has not been received, streaming application 110 may be configured to send data storage system a resend request 122, which includes an event identifier 124. In various embodiments, event identifier 124 may correspond to the event identifier that was included in an earlier-verified message received by streaming application 110. In one embodiment, for example, event identifier 124 may correspond to the event identifier included in the message that was most recently verified by streaming application 110.

In response to receiving resend request 122, data storage system 102 may, in various embodiments, be configured to resend the particular message (e.g., message 126) that was not initially received (or was received out of order) by streaming application 110. In some such embodiments, message 126 that is resent by data storage system 102 may include one or more items of information that were included in the original message 126, such as event identifier 124 or sequence number 128. In various embodiments, once streaming application 110 receives the resent message 126, it may be configured to again verify the sequence of the messages that it has received, e.g., to ensure that there are not additional messages that were lost or delayed in transit to streaming application 110. Once the messages have been received by streaming application 110, it may be configured to provide access to those messages to external system 112, as discussed above.

Figure 2A:
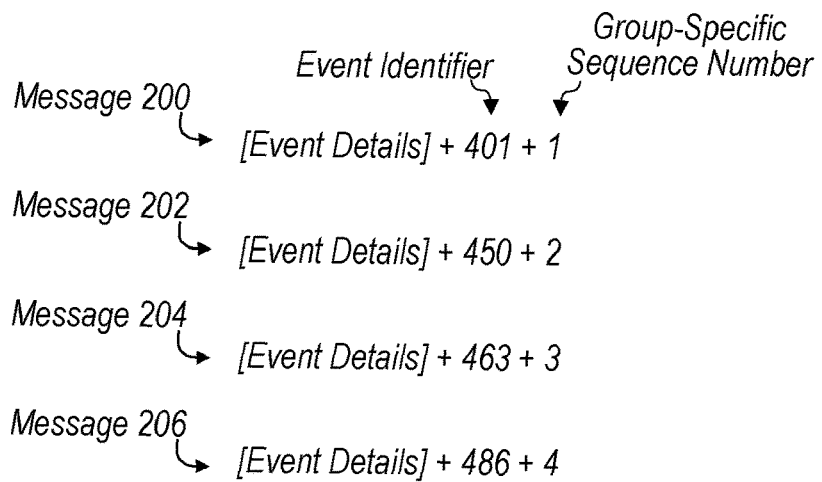
FIGS. 2A-2C depict example notification messages, according to some embodiments.
Figure 2B:
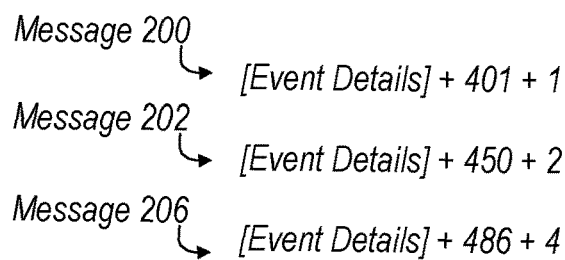
Figure 2C:
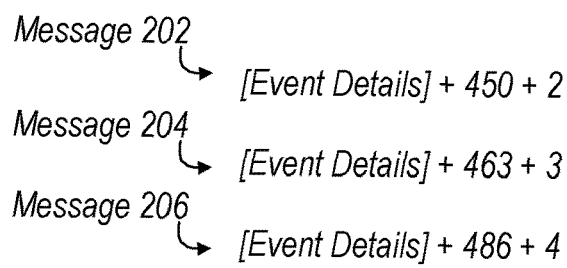

Turning now to FIGS. 2A-2C, example messages 200-206 are shown, according to one embodiment. More particularly, FIGS. 2A-2C depict an embodiment in which four messages (e.g., messages 200-206) are sent by data storage system 102 to streaming application 110 (as shown in FIG. 2A) for data events associated with group 114B. Of these four messages, one of the messages (e.g., message 204) is initially lost in transit, and is thus not received by streaming application 110 (as shown in FIG. 2B). As described above, streaming application 110 may, in response to detecting that a particular message has not been received, send a request for the particular message to the data storage system 102. Data storage system 102 may then resend one or more of the messages (e.g., message 202-206) such that streaming application 110 may receive each of the messages in order (as shown in FIG. 2C).

As will be described in more detail below with reference to FIG. 4, messages 200-206 may be specified in various formats and may include various items of information. Referring to FIG. 2A, each of messages 200-206 includes three portions—an "event details" portion providing details of the data event, an "event identifier," and a "group-specific sequence number." Note, however, that messages 200-206 are provided merely as an example and, in other embodiments, messages 200-206 may include any suitable number of portions or fields as desired. In various embodiments, the "event details" portion of the messages 200-206 may be used to specify details relating to the event for which the message was sent, including the type of event, the user or application that initiated the event, date or time of event, etc.

Further, each of the messages 200-206 include an event identifier. As noted above, in various embodiments, data storage system 102 may be configured to monitor events for a plurality of groups 114. For example, data storage system 102 may be configured to monitor data events for data associated with group 114A that is stored in data store 106, as well as data events for data associated with group 114B. Further, as noted above, data storage system 102 may be configured to assign each of the events an event identifier value that refers to the position of a given event within the stream of events that occur at data storage system 102. The manner in which data storage system 102 assigns the event identifiers may vary according to various embodiments. For example, in the depicted embodiment, data storage system 102 may use a counter to assign event identifiers to events, with the event identifier values being incremented for each successive data event that occurs during a given time period. In other embodiments, however, data storage system 102 may assign event identifiers to events based on any suitable function, incremental value, or pattern.

Note that, in the embodiment shown in FIGS. 2A-2C, the event identifiers included in messages 200-206 are not contiguous for consecutive messages, and do not necessarily follow any particular pattern. This is because, in the depicted embodiment, data storage system 102 is monitoring, and assigning event identifiers to, events associated with various other groups 114. As noted above, data storage system 102 may provide computing resources for numerous groups 114, each of which may have numerous associated users 116. In such embodiments, many data events for the various groups 114 may be generated, with events associated with one group being interspersed with the events associated with other groups within the stream of events that occur at data storage system 102. In some such embodiments, the event identifiers for the events may be assigned based on the order in which such events are generated. Accordingly, although a user 116 for a group 114 may generate multiple data events sequentially, there is no guarantee that the event identifiers for those multiple data events will be consecutively numbered.

Further, as shown in FIG. 2A, each of messages 200-206 includes a group-specific sequence number. In various embodiments, the group-specific sequence numbers included in messages 200-206 may include numbers from a monotonically-increasing (that is, never decreasing) sequence of numbers that is incremented for each successive event that matches one or more criteria associated with a particular group (e.g., group 114B, in the depicted embodiment) during a given time period. In various embodiments, the group-specific sequence numbers may be generated based on various techniques, including a counter (as shown in FIGS. 2A-2C), a linearly-increasing function, or any suitable monotonically-increasing function. Note that the embodiments in which the group-specific sequence numbers are based on an increasing function or sequence is provided merely as an example and, in other embodiments, the group-specific sequence numbers may instead be based on a decreasing function or sequence of numbers (e.g., a monotonically-decreasing sequence of numbers that is decremented for each successive event that matches one or more criteria associated with a particular group during a given time period). In such embodiments, streaming application 110 may be configured to verify the sequence of messages 200-206 received from data storage system 102 in a like manner as that described below with reference to FIG. 3. As discussed in more detail below with reference to FIG. 4, these group-specific sequence numbers may be specified in an application layer portion of the messages sent from data storage system 102 to streaming application 110.

FIG. 2B shows messages 200, 202, and 206 that are received by streaming application 110, according to one embodiment. As noted above, in the embodiment depicted in FIGS. 2A-2C, message 204 is initially lost in transit from data storage system 102 to streaming application 110.

In various embodiments, streaming application may be configured to detect that message 204 has been lost based on the group-specific sequence numbers, as explained in more detail below with reference to FIG. 3. For example, in the depicted embodiment, the group-specific sequence numbers may be incremented by a value of one for each successive event that matches one or more criteria associated with group 114B. Streaming application 110 may be configured to verify (e.g., after each message received, after receiving some predesignated number of messages, etc.) the sequence of the messages received from data storage system 102. In verifying the sequence of message 206, streaming application 110 may compare the sequence number included in message 206 (e.g., "4") with a sequence number it would "expect" to receive based on the manner in which the group-specific sequence numbers are determined and the last verified group-specific sequence number for that group.

For example, after verifying message 202, streaming application may determine that, based on the sequence number in message 202 (e.g., "2") and the function used to determine the group-specific sequence numbers (e.g., Sequence Number$_n$=Sequence Number$_{n-1}$+1), the expected sequence number for the next message it receives for group 114B is "3". In comparing the sequence number in message 206 with this expected sequence number, streaming application 110 may determine that a particular message (e.g., message 204) has been lost, delayed, or otherwise disrupted such that it received message 206 out of its intended order. In response to this determination, streaming application 110 may send a request (e.g., resend request 122) to data storage system 102 requesting that message 204 be resent. In various embodiments, this request may include the event identifier for the most recently verified message (e.g., event identifier 450 from message 202).

In response to receiving this resend request, data storage system 102 may resend one or more messages to streaming application 110 based on the event identifier included in the resend request. For example, as shown in FIG. 2C, data storage system 102 may receive the event identifier associated with message 202 and resend messages 202-206 to streaming application 110. In this way, streaming application 110 may receive the messages for data events associated with group 114B in the order in which the data events were generated. Note that, in the depicted embodiment, data storage system 102 begins resending messages with the last message that was verified by streaming application 110 (e.g., message 202). This may be particularly advantageous for situations in which multiple messages were lost in transit, and resending the last verified message would facilitate streaming application 110 in verifying that all messages were received in order. In other embodiments, however, data storage system 102 may be configured to begin resending messages starting with the first message that was lost (e.g., message 204) in order to avoid sending duplicate messages.

Figure 3:
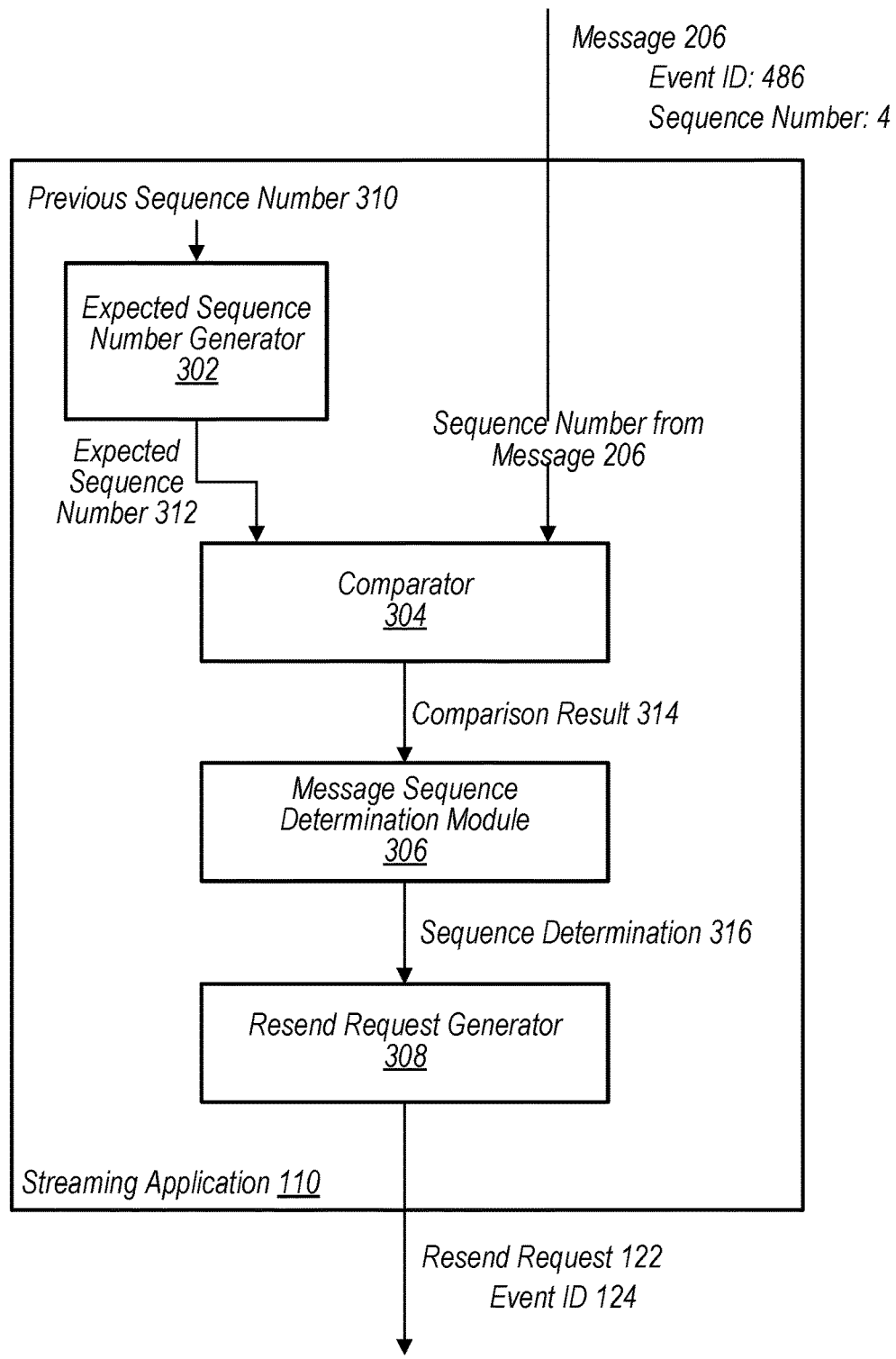
FIG. 3 is a block diagram illustrating an example streaming application, according to some embodiments.

Referring now to FIG. 3, a block diagram illustrating an example streaming application 110 is shown, according to some embodiments. In various embodiments, streaming application 110 may be configured to verify the sequence of the messages received from data storage system 102. FIG. 3 will be described with continued reference to the example demonstrated in FIGS. 2A-2C.

In FIG. 3, streaming application 110 includes various "modules" configured to perform designated functions that will be discussed in more detail below. As used herein, the term "module" refers to circuitry configured to perform specified operations or to physical, non-transitory computer-readable media that stores information (e.g., program instructions) that instructs other circuitry (e.g., a processor) to perform specified operations. Such circuitry may implemented in multiple ways, including as a hardwired circuit or as a memory having program instructions stored therein that are executable by one or more processors to perform the operations. The hardware circuit may include, for example, custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, or the like. A module may also be any suitable form of non-transitory computer readable media storing program instructions executable to perform specified operations.

In the depicted embodiment, streaming application 110 includes various modules, including expected sequence number generator 302, comparator 304, message sequence determination module 306, and resend request generator 308. In various embodiments, streaming application 110 may be configured to receive various messages, such as message 206, from data storage system 102 and verify the sequence of those messages. As shown in FIG. 3, message 206 includes an event identifier (e.g., "486") and a group-specific sequence number (e.g., "4"). As discussed above, the group-specific sequence numbers may vary in a predetermined manner such that, when a message is received out of order relative to the order in which it was sent, streaming application 110 may use the group-specific sequence numbers included in the messages to detect this occurrence.

For example, in the embodiment of FIG. 3, assume that streaming application 110 has previously received and verified the sequence of messages 200 and 202, as in FIG. 2B. In response to receiving message 206, comparator 304 may be configured to compare the group-specific sequence number from message 206 to an expected sequence number 312. In various embodiments, expected sequence number generator 302 may be configured to generate expected sequence number 312 based on one or more previous sequence numbers 310 and a function (e.g., a monotonically-increasing function) specifying the manner in which the group-specific sequence numbers are determined. For example, in some embodiments, streaming application 110 may be configured to store (e.g., in a local, persistent database for a given group 114) one or more previous sequence numbers 310 associated with one or more previously-verified messages. Streaming application 110 may be configured to use one or more such previous sequence numbers 31 to determine expected sequence number 312. For example, in one embodiment, expected sequence number generator 302 may use the group-specific sequence number included in the most-recently verified message (e.g., message 202) and the monotonically-increasing function used to generate the group-specific sequence numbers (e.g., Sequence Number$_n$=Sequence Number$_{n-1}$+1) to generate expected sequence number 312, which, in the depicted embodiment, has a value of "3."

Comparator 304 may be configured to compare this expected sequence number 312 (e.g., "3") with the sequence number from message 206 (e.g., "4") and generate comparison result 314. In various embodiments, comparison result 314 may be expressed as a Boolean value, numeric value, or in any other suitable format that specifies the outcome of the comparison performed by comparator 304.

In various embodiments, message sequence determination module 306 may be configured to generate sequence determination 316 based on comparison result 314. For example, in response to comparison result 314 indicating that the sequence number from message 206 matches the expected sequence number 312, message sequence determination module 306 may be configured to generate sequence determination 316 indicating that the sequence of message 206 is verified. Alternatively, in response to comparison result 314 indicating that the sequence number from message 206 does not match expected sequence number 312, message sequence determination module 306 may be configured to generate sequence determination 316 indicating that the sequence of message 206 is not verified (that is, one or more messages have not been received by the streaming server system in the order they were sent by data storage system 102).

In various embodiments, resend request generator 308 may be configured to generate a resend request, such as resend request 122, in response to sequence determination 316 indicating that the sequence of message 206 is not verified. For example, in response to sequence determination 316 indicating that the sequence of message 206 is not verified, resend request generator 308 may be configured to generate resend request 122, which may then be sent to data storage system 102. In various embodiments, resend request may include an event identifier 124 corresponding to the event identifier of the most-recently verified message received by streaming application 110 (e.g., message 202, in the depicted embodiment). For example, streaming application 110 may store, either in a data store associated with streaming server system 108 or a remote data store accessible to streaming server system 108, information corresponding to the messages that it receives, such as the event identifiers and corresponding group-specific sequence numbers. Streaming application 110 may then, in various embodiments, use this information to retrieve messages corresponding to events that are within a predefined retention window (e.g., 24 hours, 48 hours, etc.). As described above, once data storage system 102 receives this resend request 122, it may use the included event identifier 124 to resend one or more messages to streaming application 110.

Thus, by comparing the group-specific sequence numbers in the messages it receives to expected sequence numbers, streaming application 110 may be configured to verify both that it receives each of the messages sent by data storage system 102, and that each of the messages it does receive is in the intended sequence (e.g., in the sequence in which the corresponding data events occurred). As these group-specific sequence numbers may be specified in an application data portion of messages, in various embodiments, the disclosed systems and methods may not be limited to any particular communication protocol used to transmit the messages. Further, in response to determining that a particular message has been either lost or delayed, streaming application 110 may be configured to correct this transmission problem using one or more event identifiers to request the lost or delayed message(s) be resent. Accordingly, the disclosed systems and methods may increase the accuracy of the messages sent via data storage system 102 and streaming application 110, thereby improving the functioning of system 100 as a whole. Thus, the disclosed systems and methods may, in various embodiments, provide a technical improvement to the functioning of streaming data systems, allowing systems (e.g., external system 112) that utilize the disclosed systems and methods to operate more efficiently.

Turning now to FIG. 4, an example message 400 is depicted, according to one embodiment. In various embodiments, message 400 may be sent, for example with reference to FIG. 1, as part of an JSON message from data storage system 102 to streaming application 110 executing on streaming server system 108. Note, however, that this is merely one example and message 400 may be specified in any suitable messaging format.

As shown in FIG. 4, message 400 includes various items of information, including fields for "group_ID," "event_ID," "sequence_number," "payload," and "channel" values. Note, however, that the fields shown in message 400 are provided merely as an example and are not intended to limit the scope of this disclosure. In other embodiments, message 400 may include any fields suitable to facilitate verification of the sequence of messages received by streaming application 110.

In the depicted embodiment, the "group_ID" field is used to specify the group 114 to which message 400 corresponds. As noted above, data storage system 102 may provide computing resources for numerous groups 114, with streaming application 110 providing streaming services for many of those groups. Accordingly, streaming application 110 may use the "group_ID" field to retrieve stored event identifier or sequence number information when verifying the sequence of messages it receives. For example, in FIG. 4, the "group_ID" field specifies that message 400 corresponds to a data event associated with the data of group 114B of FIG. 1.

Message 400 further includes an "event_ID" field, which may be used to specify the event identifier of the event for which message 400 was sent. As noted above, the event identifier specified in the "event_ID" field may be refer to the position of an event within the stream of events that occur at data storage system 102 during a given time period. Message 400 further includes a "sequence_number" field, which may be used to specify a group-specific sequence number for the message 400. As noted above, the group-specific sequence number may be based on a monotonically increasing function and be used to verify the sequence of messages received by streaming application 110. The "payload" field of message 400 may be used to specify details associated with the data event, such as type of event, user or application that initiated the event, etc. Further, the "channel" field of message 400 may be used to specify the channel for which message 400 is sent.

Additionally, as demonstrated by FIG. 4, note that the group-specific sequence number for message 202 is specified in an application layer portion of the message 202 sent from data storage system 102 to streaming application 110. Stated differently, the group-specific sequence numbers may be specified in an application data portion of one or more data packages used to transmit the messages between data storage system 102 and streaming application 110. Note that such an application data portion is separate from one or more transport layer sequence numbers included in one or more transport layer headers used to transmit the messages (e.g., a sequence number in a TCP header field).

Figure 5:
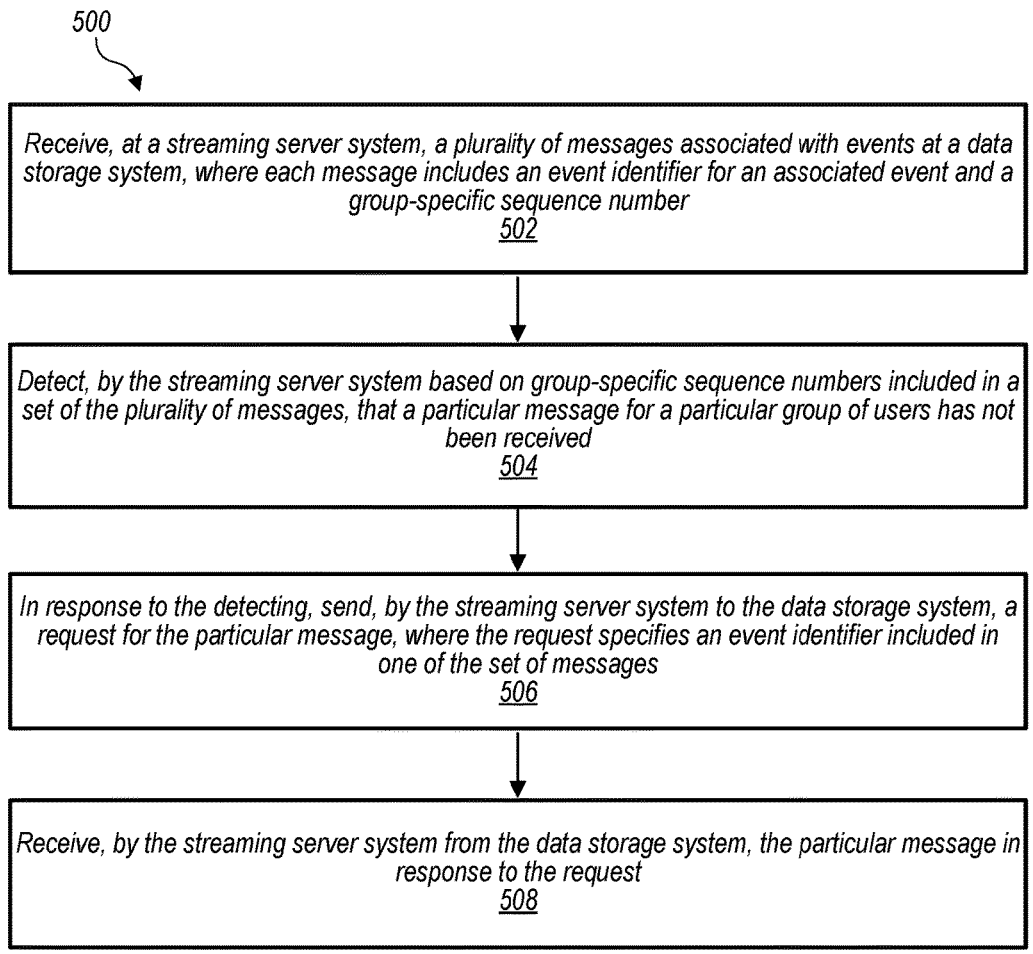
FIG. 5 is a flow diagram illustrating an example method for verifying the sequence of messages, according to some embodiments.

Referring now to FIG. 5, a flow diagram illustrating an example method 500 for verifying the sequence of messages is depicted, according to some embodiments. In various embodiments, method 500 may be performed, e.g., by streaming server system 110 of FIG. 1, to verify the sequence of messages received from data storage system 102.

In FIG. 5, method 500 includes elements 502-508. While these elements are shown in a particular order for ease of understanding, other orders may be used. In various embodiments, some of the method elements may be performed concurrently, in a different order than shown, or may be omitted. Additional method elements may also be performed as desired. Element 502 includes receiving a plurality of messages associated with events at data storage system 102. In some embodiments, each of the plurality of messages includes an event identifier for an associated event and a group-specific sequence number. For example, with reference to FIGS. 2A-2C, streaming application 110 may receive messages 200, 202, and 206 from data storage system 102.

Method 500 then proceeds to element 504, which, as described in more detail below with reference to FIG. 6, includes detecting, based on group-specific sequence numbers included in a set of the plurality of messages, that a particular message for a particular group of users has not been received. For example, streaming application 110 may determine, based on group-specific sequence numbers included in messages 202 and 206, for example, that message 204 has not been received (or has been received out of order).

Method 500 then proceeds to element 506, which includes, in response to the detecting, sending, by the streaming server system 108 to the data storage system 102, a request for the particular message, where the request specifies an event identifier included in one of the set of messages. For example, as shown in FIG. 3, streaming application 110 may send a resend request 122, including an event identifier 124 of a most recently verified message, to data storage system 102 requesting that one or more of the messages be resent to streaming application 110.

Method 500 then proceeds to element 508, which includes receiving, by the streaming server system 108 from the data storage system 102, the particular message in response to the request. For example, in response to receiving the resent request 122, data storage system 102 may resend message 204 to streaming application 110.

Figure 6:
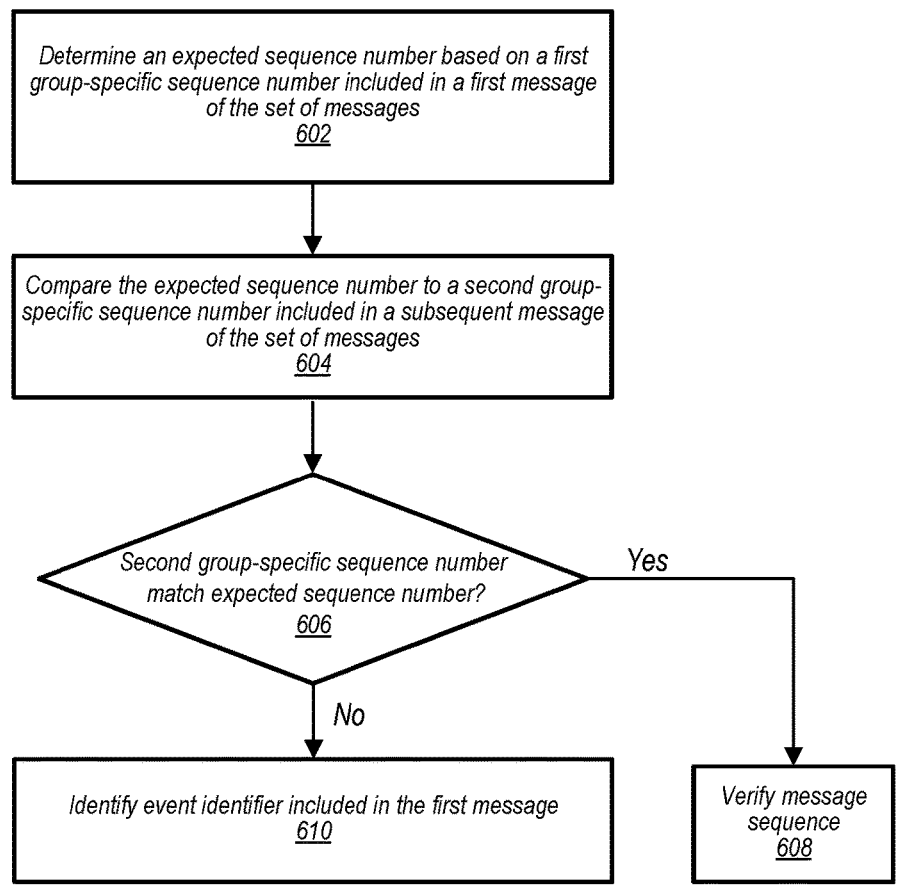
FIG. 6 is a flow diagram illustrating an example method for detecting that a particular message has not been received, according to some embodiments.

Turning now to FIG. 6, a flow diagram illustrating an example method 600 for detecting that a particular message has not been received by a streaming application is shown, according to some embodiments. In various embodiments, method 600 may be performed, for example, by streaming application 110 of FIG. 1. In FIG. 6, method 600 includes elements 602-610. While these elements are shown in a particular order for ease of understanding, other orders may be used. In various embodiments, some of the method elements may be performed concurrently, in a different order than shown, or may be omitted. Additional method elements may also be performed as desired.

Element 602 includes determining an expected sequence number based on a first group-specific sequence number included in a first message of the set of messages. For example, with reference to FIGS. 2B and 3, expected sequence number generator 302 may be configured to generate expected sequence number 312 based on one or more previous sequence numbers 310, such as a group-specific sequence number included in one or more of previously-received messages 200 or 202. In one embodiment, expected sequence number 312 may be generated based on the message that was most-recently verified by streaming application 110 for that particular group (e.g., message 202, in the described embodiment). In other embodiments, however, expected sequence number 312 may be generated based on a message received prior to the most-recently verified message (e.g., message 200). In some embodiments, the expected sequence number may be generated based on a monotonically-increasing function.

Method 600 then proceeds to element 604, which includes comparing the expected sequence number to a second group-specific sequence number included in a subsequent message of the set of messages. For example, comparator 304 may be configured to compare the expected sequence number 312 to the sequence number included in message 206 to generate comparison result 314.

Method 600 then proceeds to element 606, which includes determining whether the second group-specific sequence number matches the expected sequence number. For example, message sequence determination module 306 may be configured to generate sequence determination 316 based on comparison result 314. If the second group-specific sequence number matches the expected sequence number, method 600 proceeds to element 608, which includes verifying the message. If, however, the second group-specific sequence number does not match the expected sequence number, method 600 proceeds to element 610, which includes identifying the event identifier included in the first message. In various embodiments, this event identifier may be included in a resend request, such as resend request 122, sent to data storage system 102, as described with reference to FIG. 3.

Figure 7:
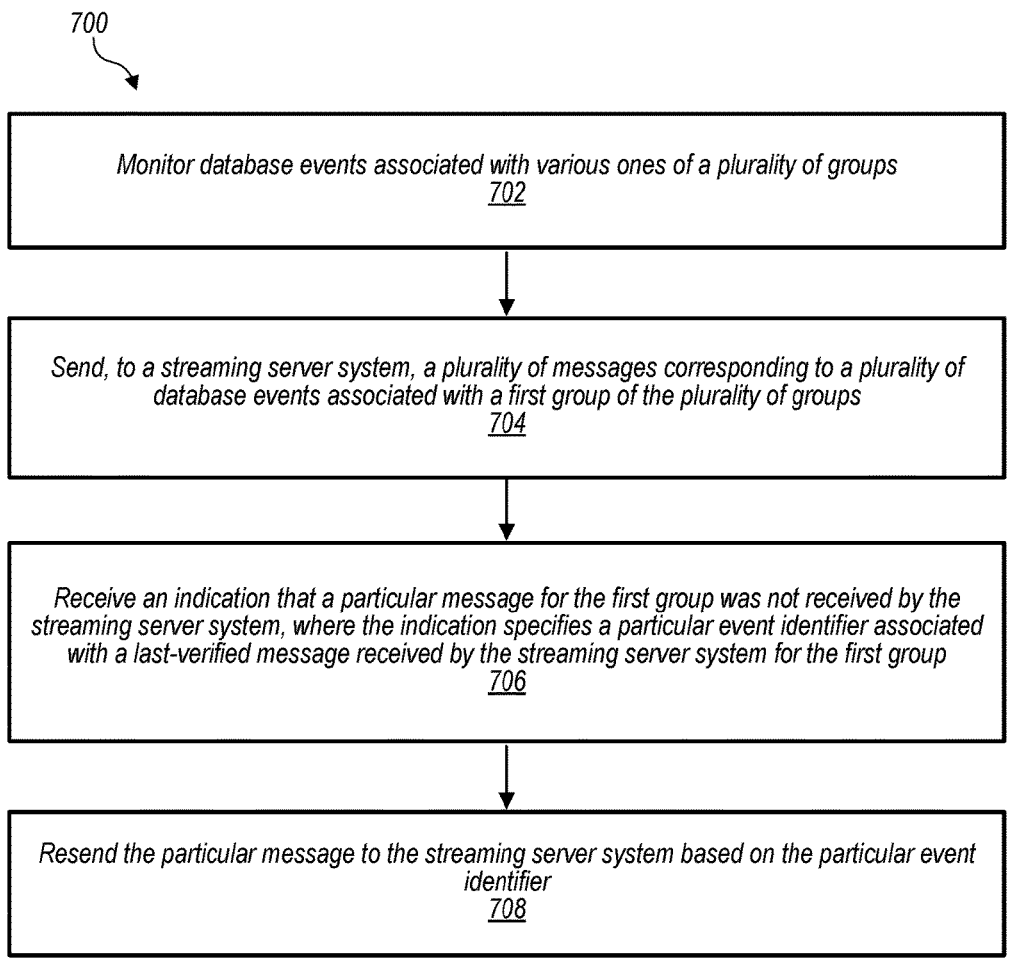
FIG. 7 is a flow diagram illustrating an example method for correcting a sequence of messages, according to some embodiments.

Referring now to FIG. 7, a flow diagram illustrating an example method 700 for correcting the sequence of messages received by a streaming application is shown, according to some embodiments. In various embodiments, method 700 may be performed, for example, by data storage system 102 of FIG. 1. In FIG. 7, method 700 includes elements 702-708. While these elements are shown in a particular order for ease of understanding, other orders may be used. In various embodiments, some of the method elements may be performed concurrently, in a different order than shown, or may be omitted. Additional method elements may also be performed as desired.

Element 702 includes monitoring database events associated with various ones of a plurality of groups. For example, data storage system 102 may be accessible to a plurality of groups 114, and may be configured to send a message to streaming server system 108 in response to a given database event matching criteria specified by a corresponding group.

Method 700 then proceeds to element 704, which includes sending a plurality of messages to streaming server system 108, where the plurality of messages correspond to a plurality of database events associated with a first group (e.g., group 114B). In some embodiments, each of the plurality of messages may include an event identifier, such as event identifier 118, for a corresponding database event, and a group-specific sequence number, such as sequence number 120, associated with the first group. In some embodiments, sending the plurality of messages may include determining content for the given message based on an associated database event (e.g., event detail such as event type, date, time, etc.). Further, in some embodiments, sending the plurality of messages may include determining a group-specific sequence number (e.g., sequence number 120) associated with the first group to include in the given message. In some such embodiments, the group-specific sequence number may be a number from a monotonically-increasing sequence of numbers that is incremented for each successive event that matches one or more criteria associated with a particular group during a given time period.

Note that, in some embodiments, the first group (e.g., group 114B) may specify multiple criteria for which notification messages are to be sent. In such an embodiment, element 704 may include sending a first subset of messages in response to database events matching a first criteria specified by the first group, and sending a second subset of messages in response to database events matching a second criteria specified by the first group. Further, in such an embodiment, element 704 may include determining a different group-specific sequence number associated with the first group for each of the plurality of messages, where the different group-specific sequence numbers are based on a monotonically-increasing function and are incremented for each successive event that matches one or more criteria associated with the particular group, including the first and second criteria, during a given time period.

Method 700 then proceeds to element 706, which includes receiving, from streaming server system 108, an indication that a particular message, such as message 126, was not received by streaming server system 108, where the indication specifies a particular event identifier associated with a last verified message received by the streaming server system 108 for the first group.

Method 700 then proceeds to element 708, which includes resending the particular message to the streaming server system 108 based on the particular identifier. In some embodiments, resending the particular message may include sending a second message that includes the particular event identifier and the particular group-specific sequence number associated with the first group that were included in the originally-send particular message.

Further, as noted above, data storage system 102 may be configured to monitor database events associated with a plurality of groups. Accordingly, in some embodiments, method 700 may further include sending a second plurality of messages to streaming server system 108, where the second plurality of messages correspond to a second plurality of database events associated with a second group of the plurality of groups. In such embodiments, each of the second plurality of messages may include an event identifier for a corresponding database event of the second plurality of database events, and a group-specific sequence number associated with the second group, where the group-specific sequence numbers associated with the second group are determined independently from the group-specific sequence number associated with the first group.

With reference to FIGS. 8-11, systems and methods for retrieving an event identifier will be described. As described herein, data storage system 102 and streaming application 110 may be configured to provide notification messages (e.g., to external system 112) for data events associated with a particular group of users that meet one or more specified criteria. In the example discussed above with reference to FIG. 1, for instance, external system 112 may be a data analytics system that analyzes data for a group of users (e.g., for users 116 associated with group 114B) to generate insightful information that may be used to augment other software applications. Thus, in various embodiments, data storage system 102 and streaming application 110 may be configured to provide notification messages to external system 112 for data events of group 114B that meet one or more specified criteria as the data events occur (e.g., in real-time or near real-time).

In some such embodiments, it may be desirable for external system 112 to receive notification messages not only for present data events that meet one or more criteria, but also for past data events that were generated before group 114B opted to use the services provided by external system 112. Stated differently, a number of data events associated with group 114B may have been generated (e.g., by users 116B-116C, software applications, etc.) prior to group 114B electing to use the services provided by external system 112. To provide its data analytic services, it may be desirable for external system 112 to have data corresponding to all or some of those past data events (e.g., those past data events that satisfy at least one of one or more specified criteria) in addition to having data corresponding to events taking place after group 114B opts to use the services provided by external system 112, in some embodiments.

In some such embodiments, data storage system 102 may be configured to perform a bulk data extraction for group 114B by identifying past events associated with group 114B that meet one or more specified criteria and sending messages associated with those events to streaming application 110. Streaming application 110 may be configured to provide the messages associated with the bulk data extraction to external system 112.

In some embodiments, such a bulk data extraction may be a time-consuming process (e.g., multiple days in duration). Further, while the bulk data extraction is taking place, various data events associated with group 114B may be generated at data storage system 102. In various embodiments, it may be desirable to send notification messages corresponding to these intervening events (that is, the data events being generated while the bulk data extraction is being performed) to external system 112. One possible approach may be to send notification messages corresponding to these intervening events as the intervening events occur, such that the bulk data extraction and the messages for the intervening events are sent in parallel. As noted above, however, it may also be desirable, in various embodiments, for external system 112 to receive notification messages for data events in the order in which the data events were generated, and such parallel transmission of the notification messages may cause streaming application 110 to receive the notification messages out of this time-ordered sequence.

Figure 8:
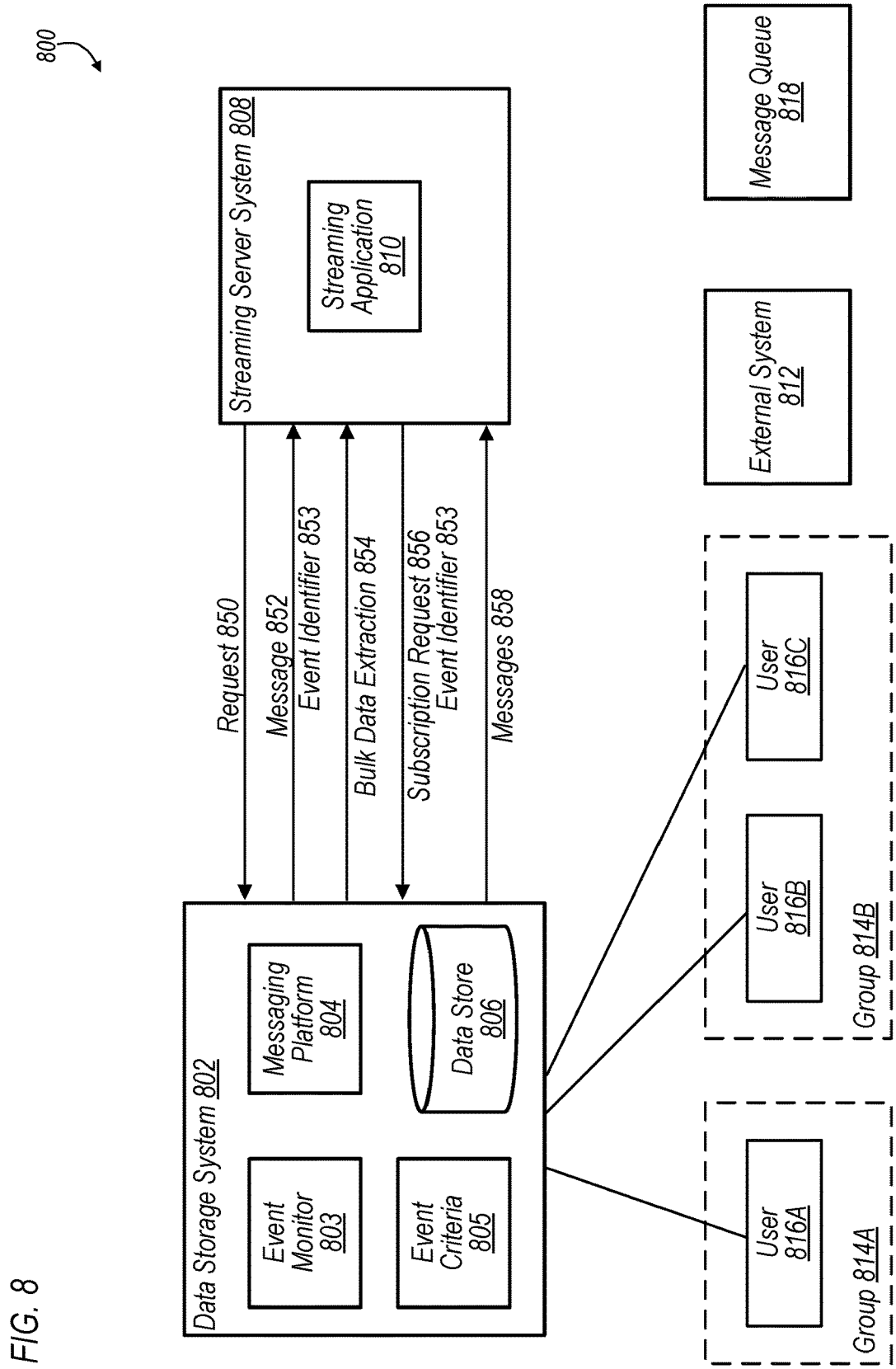
FIG. 8 is a block diagram illustrating an example system, according to some embodiments.

Turning now to FIG. 8, a block diagram illustrating an example system 800 is depicted. In various embodiments, system 800 may be configured to perform a bulk data extraction associated with one or more groups of users. Further, after the bulk data extraction has been completed, system 800 may be configured to send notification messages for intervening data events associated with the one or more groups of users that where generated while the bulk data extraction was being performed. As described in more detail below, system 800 may be configured to send the notification messages for the intervening data events starting with a first data event (that meets one or more specified criteria) that occurred after the bulk data extraction was initiated. In this way, system 800 may be operable to provide notification messages to an external system for data events that occurred before, during, and after the bulk data extraction in the order in which the corresponding data events occurred.

In FIG. 8, system 800 includes data storage system 802, streaming server system 808 (on which streaming application 810 is executing), external system 812, users 816, and message queue 818. In some embodiments, data storage system 802 may be a multi-tenant computer system configured to provide computing resources to various tenants. In such an embodiment, for example, groups 814A and 814B may correspond to first and second tenants of the multi-tenant computer system. Although shown in direct connection, note that one or more of data storage system 802, streaming server system 808, external system 812, users 816, or message queue 818 may be connected via one or more communication networks (not shown for clarity). Further note that, in various embodiments, one or more of data storage system 802, streaming server system 808 (on which streaming application 810 is executing), external system 812, and users 816 of FIG. 8 may correspond to data storage system 102, streaming server system 108 (on which streaming application 110 is executing), external system 112, and users 116 of FIG. 1, respectively.

With reference to FIG. 8, consider an example embodiment in which group 814B opts to use services (e.g., data analytic services) provided by external system 112. In such an embodiment, it may be desirable for external system 812 have data corresponding to certain ones of group 814B's past data events. Accordingly, data storage system 802 may be configured to perform a bulk data extraction for group 814B. As shown in FIG. 8, streaming application 810 may be configured to send a first request 850 to data storage system 802. In some embodiments, request 850 may be sent to data storage system 802 prior to the initiation of a bulk data extraction for a group 814B. As described in more detail below with reference to FIG. 9, request 850 may be sent by streaming application 810 to elicit an indication of the event identifier associated with a most-recent event in the stream of events occurring at data storage system 802.

In some embodiments, data storage system 802 may be configured to, in response the first request, send notification message 852 to streaming application 810. As shown in FIG. 8, message 852 may, in various embodiments, include event identifier 853 associated with a most-recent data event generated at data storage system 802. That is, in the depicted embodiment, event identifier 853 may correspond to a data event generated shortly prior to initiation of the bulk data extraction. As explained in more detail below, retrieving event identifier 853 from data storage system 802 at a time shortly before initiation of bulk data extraction 854 may allow streaming application 810 to, after the bulk data extraction 854 is completed, subscribe to notification messages for events starting with event identifier 853.

Subsequent to sending message 852, data storage system 802 may, in various embodiments, be configured to perform bulk data extraction 854. As noted above, in various embodiments, bulk data extraction 854 for group 814B may correspond to a transfer of messages for past data events of group 814B that meet one or more specified criteria. For example, in one embodiment, bulk data extraction 854 may correspond to a transfer of notification messages for all past data events for group 814B that match a first and second specified criteria.

As noted above, bulk data extraction 854 may be a time-consuming process (e.g., multiple days in duration), in some embodiments. While bulk data extraction 854 is taking place, various data events associated with group 114B may be generated (e.g., by users 816B or 816C, software applications, etc.) at data storage system 802. In various embodiments, data storage system 802 may be configured, e.g., using event monitor 803, to monitor these intervening data events associated with group 114B while the bulk data extraction is being performed.

After completion of bulk data extraction 854, streaming application 810 may be configured, in various embodiments, to send subscription request 856 to data storage system 802, requesting to subscribe to notification messages for data events associated with group 814B that meet one or more specified criteria. As shown in FIG. 8, subscription request 856 may, in some embodiments, specify event identifier 853 as a starting point of data events for which to send the notification messages. For example, streaming application 810 may subscribe to one or more channels associated with group 814B such that message platform 804 may send notification messages for those channels to streaming application 810.

As shown in FIG. 8, for example, after receiving subscription request 856, data storage system 802 may, in various embodiments, be configured to send to streaming application 810 a plurality of notification messages 858 for a plurality of data events that meet at least one of the specified criteria. Further, in various embodiments, the plurality of data events for which messages 858 are sent may have event identifiers that start at, or are subsequent to, event identifier 853. Stated differently, the events for which messages 858 are sent may have occurred at or subsequent to the event associated with event identifier 853.

The disclosed systems and methods may provide various improvements to the functioning of data storage system 802 and streaming server system 808, as well as improve the operation of system 800 as a whole. For example, as noted above, notification messages may be provided in various manners, including as part of a bulk data extraction, in which a large number of notification messages for past data events are sent to streaming server system 808 at once, as well as in a "near real-time" manner, in which notification messages for data events are sent soon after the data events occur. The disclosed systems and methods of obtaining event identifier 853 (which is associated with a most-recent event in the occurring at data storage system 802) prior to a bulk data extraction 854 may, in various embodiments, facilitate delivery of notification messages corresponding to data events that occurred before, during, and after bulk data extraction 854 in the order in which those corresponding data events occurred (that is, in a time-ordered sequence). Additionally, in some embodiments, a large number (e.g., millions) of data events may have occurred at data storage system 802 while the bulk data extraction was being performed. The disclosed method and system for obtaining event identifier 853 may allow streaming application 810 to specify a starting point of data events for which to send the notification messages, which may be more time- and computationally-efficient than requiring data storage system to traverse a large number of data events in the stream of data events to determine a point from which to begin sending messages.

Figure 9:
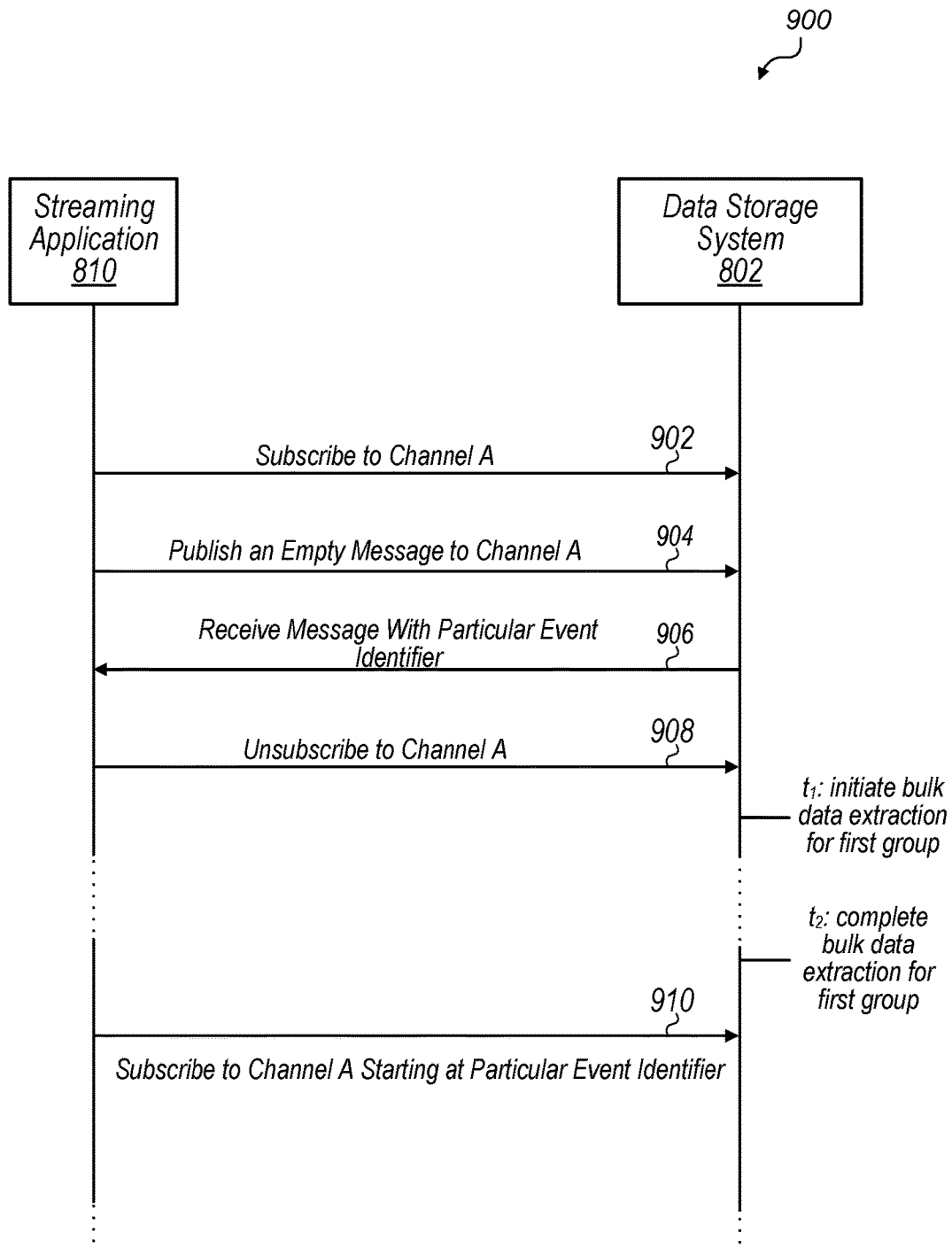
FIG. 9 is a communication diagram illustrating an example exchange between a streaming server system and a data storage system, according to some embodiments.

Referring now to FIG. 9, a communication diagram of an exchange 900 between streaming application 810 and data storage system 802 is depicted, according to some embodiments. In the illustrated embodiment, exchange 900 begins at 902 with streaming application 810 sending a request to subscribe to a channel (e.g., "Channel A") associated with the data storage system 802. Channel A may, in some embodiments, may be a channel associated with a particular group (e.g., group 814B). In other embodiments, however, Channel A need not be associated with any one particular group, as communications 902-908 may be performed in order to obtain an event identifier, such as event identifier 853, associated with a most-recent data event generated at data storage system 802.

At 904, streaming application 810 publishes an "empty message" to Channel A (e.g., a message with no content in a payload portion of the message). In some embodiments, communication 904 may correspond to request 850 of FIG. 8. In the illustrated embodiment, streaming application 810 has previously subscribed to Channel A, and will thus get notification messages for events associated with Channel A. For example, in response to publishing the empty message to Channel A, streaming application 810 may receive, at 906, a message with a particular event identifier for a most-recent data event generated at data storage system 802 (e.g., event identifier 853). Note that, in some embodiments, communication 906 may correspond to message 852 of FIG. 8.

At 908, streaming application 810 sends a request to data storage system 802 to unsubscribe from Channel A. As noted above, sending notification messages for intervening data events that occur while performing the bulk data extraction (that is, in parallel) may cause streaming application 810 to receive the notification messages out of the time-ordered sequence. As streaming application 810 subscribed to Channel A at 902, however, failure to unsubscribe from Channel A prior to the bulk data extraction would result in such parallel transfer of notification messages corresponding to group 814B.

As shown in FIG. 9, subsequent to streaming application 810 unsubscribing from Channel A, data storage system 802 may be configured to initiate a bulk data extraction for group 814B at time $t_1$. As noted above, the bulk data extraction may be a time-consuming process and, in FIG. 9, lasts until time $t_2$, upon its completion. Subsequent to completion of the bulk data extraction, streaming application 810 sends, at 910, a request to subscribe to Channel A starting at a particular event identifier. For example, the request sent at 910 may specify event identifier 853 as the starting point of data events for which to send the notification messages. In various embodiments, the one or more messages may correspond to the particular group 814 for which the bulk data extraction was performed (e.g., group 814B). Note that, in some embodiments, communication 910 may include a request to subscribe to one or more other channels instead of, or in addition to, Channel A.

As noted above, a client (e.g., external system 812) may define a given channel, such as Channel A, of events for which to receive notification messages by specifying one or more criteria for those events (e.g., as a SQL query). A client may then subscribe to one or more of the defined channels, as in communication 910, in order to receive notification messages when an event is generated that meets the criteria for one or more of the channels. Note that, in some embodiments, Channel A may not be of particular interest to external system 812, but simply used by streaming application 810 as a mechanism for retrieving event identifier 853. For example, in some embodiments, streaming application 810 may utilize the same channel—Channel A—as a mechanism for retrieving a most-recent event identifier, regardless of the group 814 for which a bulk data extraction is being performed. Thus, in some such embodiments, streaming application 810 may not subscribe to Channel A at 910.

Figure 10:
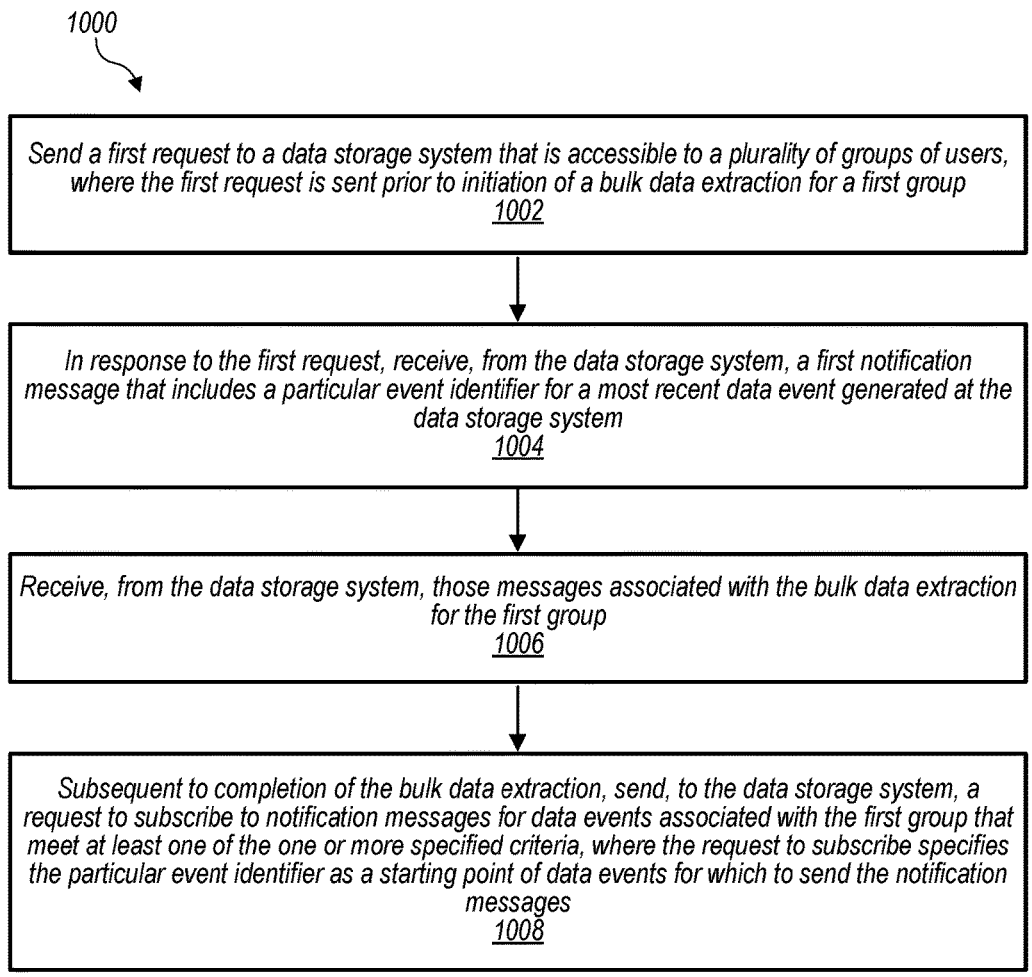
FIG. 10 is a flow diagram illustrating an example method for retrieving an event identifier prior to a bulk data extraction, according to some embodiments.

Turning now to FIG. 10, a flow diagram illustrating an example method 1000 for retrieving an event identifier prior to a bulk data extraction is depicted, according to some embodiments. In various embodiments, method 1000 may be performed, e.g., by streaming application 810 of FIG. 8.

In FIG. 10, method 1000 includes elements 1002-1008. While these elements are shown in a particular order for ease of understanding, other orders may be used. In various embodiments, some of the method elements may be performed concurrently, in a different order than shown, or may be omitted. Additional method elements may also be performed as desired. Element 1002 includes sending a first request to a data storage system that is accessible to a plurality of users, where the first request is sent prior to initiation of a bulk data extraction for a first group. For example, streaming application 810 may send request 850 to data storage system 802 prior to initiation of bulk data extraction 854. As noted above, the bulk data extraction may be a transfer of messages for past events of the first group that meet one or more specified criteria.

Method 1000 then proceeds to element 1004, which includes, in response to the first request, receiving, from the data storage system, a first notification message that includes a particular event identifier associated with a most recent data event generated at the data storage system. For example, streaming application 810 may receive message 852, including event identifier 853, from data storage system 802. In various embodiments, event identifier 853 may correspond to a most-recent data event generated at data storage system 802.

Method 1000 then proceeds to element 1006, which includes receiving, from the data storage system, those messages associated with the bulk data extraction for the first group. For example, streaming application 810 may receive bulk data extraction 854 from data storage system 802. In some embodiments, for example, the bulk data extraction for group 814B may be initiated in response to a selection by group 814B to utilize services provided by external system 812. Method 1000 then proceeds to element 1008, which includes, subsequent to completion of the bulk data extraction, sending a request to the data storage system to subscribe to notification messages for data events associated with the first group that meet at least one of the one or more specified criteria, where the request to subscribe specifies the particular event identifier as a starting point of data events for which to send the notification messages. For example, streaming application 810 may send subscription request 856 to data storage system 802, specifying event identifier 853 as the starting point of the event stream from which to subscribe.

In some embodiments, method 1000 may further include, subsequent to sending the request to subscribe, receiving a plurality of notification messages for a plurality of data events that meet at least one of the one or more specified criteria. In some such embodiments, the plurality of events are associated with respective identifiers that are subsequent to the particular event identifier. Further, in some such embodiments, one or more of the event identifiers correspond to data events that occurred during the transfer of messages for past data events of the first group (e.g., group 814B) associated with the bulk data transaction.

Additionally, in some embodiments, method 1000 may further include storing data corresponding to the bulk data extraction for the first group in a message queue accessible to the external system. For example, in some embodiments, streaming application 810 may be configured to store data corresponding to bulk data extraction 854 in message queue 818, which may be accessible to external system 812. Further, in some embodiments, method 1000 may include providing data corresponding to some or all of the bulk data extraction directly to an external system (e.g., external system 812) authorized by the first group (e.g., group 814B).

Further, in some embodiments, streaming application 810 may be configured to verify the sequence of various messages included as part of the bulk data extraction 854 or messages 858. For example, one or more of these messages may include group-specific sequence numbers. As described above with reference to FIGS. 2A-2C and 3, streaming application 810 may use these group-specific sequence numbers to verify the sequence of notification messages included as part of the bulk data extraction 854 and messages 858, as well as the sequence of messages 858 relative to the messages in bulk data extraction 854.

Figure 11:
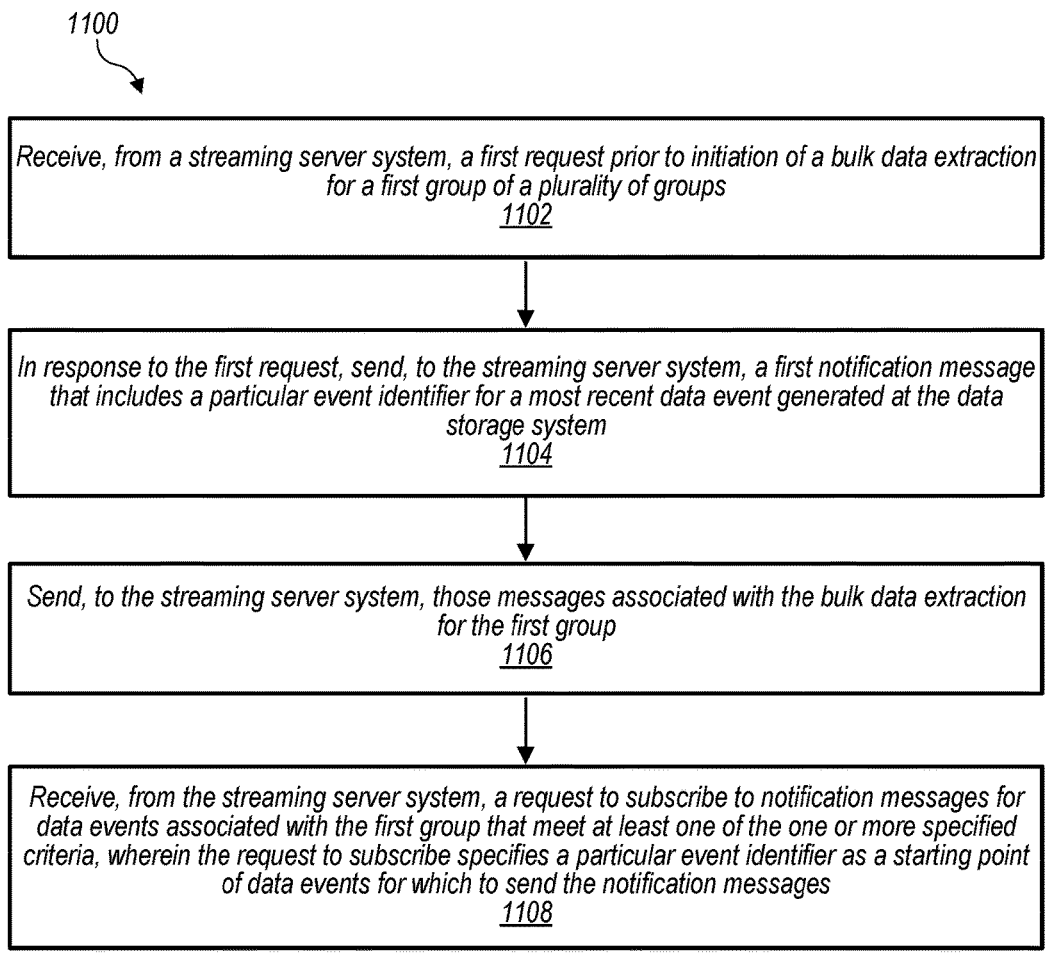
FIG. 11 is a flow diagram illustrating an example method for providing an event identifier to a streaming server system prior to a bulk data extraction, according to some embodiments.

Referring now to FIG. 11, a flow diagram illustrating an example method 1100 for providing an event identifier prior to a bulk data extraction is depicted, according to some embodiments. In various embodiments, method 1100 may be performed, e.g., by data storage system 802 of FIG. 8, and may be a complementary method to the method 1000 performed by streaming application 810.

In FIG. 11, method 1100 includes elements 1102-1108. While these elements are shown in a particular order for ease of understanding, other orders may be used. In various embodiments, some of the method elements may be performed concurrently, in a different order than shown, or may be omitted. Additional method elements may also be performed as desired. Element 1102 includes receiving, from a streaming server system 808, a first request 850 sent prior to the initiation of a bulk data extraction for a first group 814B.

Method 1100 then proceeds to element 1104, which includes, in response to the first request 850, sending, to the streaming server system 808, a first notification message 852 that includes a particular event identifier 853 for a most-recent data event generated at the data storage system 802. Method 1100 then proceeds to element 1106, which includes sending, to the streaming server system 808, those messages associated with a bulk data extraction 854 for the first group 814B. Method 1100 then proceeds to element 1108, which includes receiving, from the streaming server system 808, a request 856 to subscribe to notification messages for data events associated with the first group 814B that meet at least one of the one or more specified criteria. In some embodiments, subscription request 856 specifies event identifier 853 as a starting point of data events for which to send the notification messages.

In some embodiments, method 1100 further includes, subsequent to receiving the subscription request 856, sending, to the streaming server system 808, a plurality of notification messages for a plurality of data events that meet at least one of the one or more specified criteria, where the plurality of data events occurred subsequent to a particular data event associated with the event identifier 853. Note that, in some embodiments, data storage system 802 may store information corresponding to past data events for a given time period, or "retention window." The duration of the retention window may vary according to various embodiments (e.g., 24 hours, 1 week, etc.). In various embodiments, a client (e.g., external system 812) may be able to obtain messages corresponding to a particular data event so long as that particular data event is within the retention window. In some embodiments, e.g., in an embodiment in which the retention window is 24 hours, the bulk data extraction may last longer than the retention window. Such an instance may create an opportunity for data storage system 802 to fail to provide notification messages for those data events to external system 812.

In various embodiments, data storage system 802 may extend the duration of the retention window for a particular group, e.g., group 814B, during performance of a bulk data extraction to the extent that the bulk data extraction exceeds the retention window. This may, in various embodiments, permit data storage system 802 to send notification messages corresponding to all data events within the extended retention window (e.g., as part of messages 858) that meet at least one of the specified criteria.

Example Computer System

Figure 12:
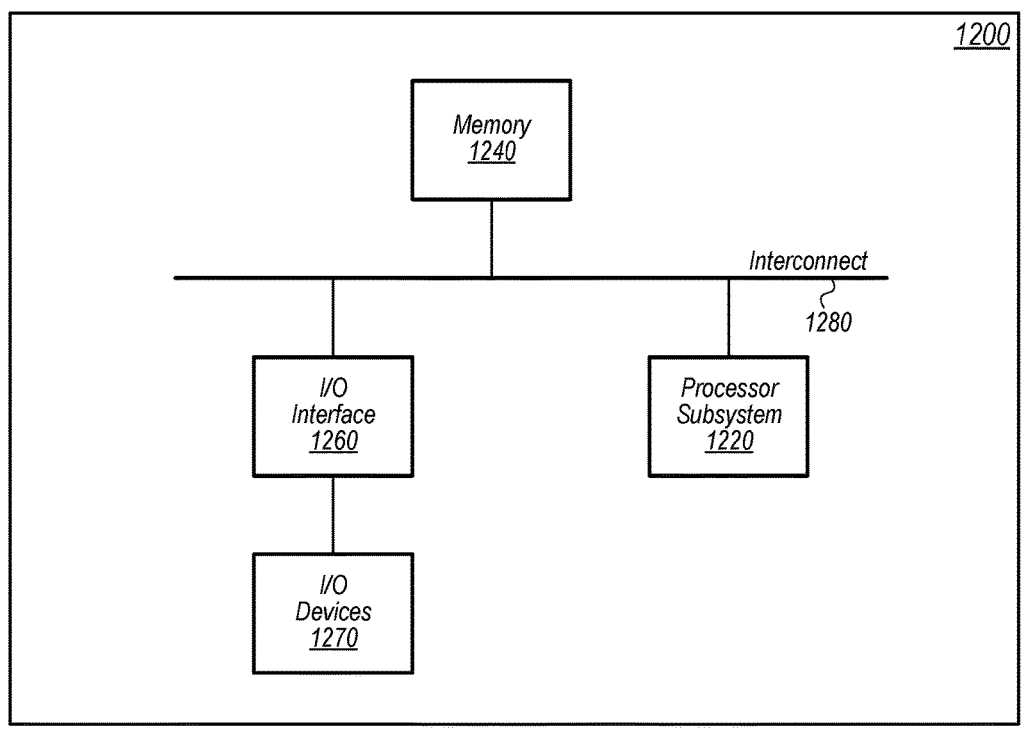
FIG. 12 is a block diagram illustrating an example computer system, according to some embodiments.

Referring now to FIG. 12, a block diagram of an example computer system 1200 is depicted, which may implement one or more computer systems, such as data storage system 102 or streaming server system 108 of FIG. 1, according to various embodiments. Computer system 1200 includes a processor subsystem 1220 that is coupled to a system memory 1240 and I/O interfaces(s) 1260 via an interconnect 1280 (e.g., a system bus). I/O interface(s) 1260 is coupled to one or more I/O devices 1270. Computer system 1200 may be any of various types of devices, including, but not limited to, a server system, personal computer system, desktop computer, laptop or notebook computer, mainframe computer system, server computer system operating in a datacenter facility, tablet computer, handheld computer, workstation, network computer, etc. Although a single computer system 1200 is shown in FIG. 12 for convenience, computer system 1200 may also be implemented as two or more computer systems operating together.

Processor subsystem 1220 may include one or more processors or processing units. In various embodiments of computer system 1200, multiple instances of processor subsystem 1220 may be coupled to interconnect 1280. In various embodiments, processor subsystem 1220 (or each processor unit within 1220) may contain a cache or other form of on-board memory.

System memory 1240 is usable to store program instructions executable by processor subsystem 1220 to cause system 1200 perform various operations described herein. System memory 1240 may be implemented using different physical, non-transitory memory media, such as hard disk storage, floppy disk storage, removable disk storage, flash memory, random access memory (RAM-SRAM, EDO RAM, SDRAM, DDR SDRAM, RAMBUS RAM, etc.), read only memory (PROM, EEPROM, etc.), and so on. Memory in computer system 1200 is not limited to primary storage such as system memory 1240. Rather, computer system 1200 may also include other forms of storage such as cache memory in processor subsystem 1220 and secondary storage on I/O devices 1270 (e.g., a hard drive, storage array, etc.). In some embodiments, these other forms of storage may also store program instructions executable by processor subsystem 1220.

I/O interfaces 1260 may be any of various types of interfaces configured to couple to and communicate with other devices, according to various embodiments. In one embodiment, I/O interface 1260 is a bridge chip (e.g., Southbridge) from a front-side to one or more back-side buses. I/O interfaces 1260 may be coupled to one or more I/O devices 1270 via one or more corresponding buses or other interfaces. Examples of I/O devices 1270 include storage devices (hard drive, optical drive, removable flash drive, storage array, SAN, or their associated controller), network interface devices (e.g., to a local or wide-area network), or other devices (e.g., graphics, user interface devices, etc.). In one embodiment, I/O devices 1270 includes a network interface device (e.g., configured to communicate over WiFi, Bluetooth, Ethernet, etc.), and computer system 1200 is coupled to a network via the network interface device.

Although the embodiments disclosed herein are susceptible to various modifications and alternative forms, specific embodiments are shown by way of example in the figures and are described herein in detail. It should be understood, however, that figures and detailed description thereto are not intended to limit the scope of the claims to the particular forms disclosed. Instead, this application is intended to cover all modifications, equivalents and alternatives falling within the spirit and scope of the disclosure of the present application as defined by the appended claims. The headings used herein are for organizational purposes only and are not meant to be used to limit the scope of the description.

This disclosure includes references to "one embodiment," "a particular embodiment," "some embodiments," "various embodiments," "an embodiment," etc. The appearances of these or similar phrases do not necessarily refer to the same embodiment. Particular features, structures, or characteristics may be combined in any suitable manner consistent with this disclosure.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

As used herein, the terms "first," "second," etc. are used as labels for nouns that they precede, and do not imply any type of ordering (e.g., spatial, temporal, logical, etc.), unless stated otherwise. For example, in a multi-tenant computer system, the terms "first tenant" and "second tenant" may be used to refer to any two tenants of the multi-tenant computer system.

When used in the claims, the term "or" is used as an inclusive or and not as an exclusive or. For example, the phrase "at least one of x, y, or z" means any one of x, y, and z, as well as any combination thereof (e.g., x and y, but not z).

It is to be understood that the present disclosure is not limited to particular devices or methods, which may, of course, vary. It is also to be understood that the terminology used herein is for the purpose of describing particular embodiments only, and is not intended to be limiting. As used herein, the singular forms "a," "an," and "the" include singular and plural referents unless the context clearly dictates otherwise. Furthermore, the word "may" is used throughout this application in a permissive sense (i.e., having the potential to, being able to), not in a mandatory sense (i.e., must). The term "include," and derivations thereof, mean "including, but not limited to." The term "coupled" means directly or indirectly connected.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "memory device configured to store data" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function after programming.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A method, comprising:
  sending, by a streaming server system, a first request to a data storage system that is accessible to a plurality of groups of users, wherein the first request is sent prior to initiation of a bulk data extraction for a first group of the plurality of groups, wherein the bulk data extraction is a transfer of messages for past data events of the first group that meet one or more specified criteria;

in response to the first request, receiving, by the streaming server system from the data storage system, a first notification message that includes a particular event identifier for a most recent data event generated at the data storage system;

receiving, by the streaming server system from the data storage system, those messages associated with the bulk data extraction for the first group; and subsequent to completion of the bulk data extraction, sending, by the streaming server system to the data storage system, a request to subscribe to notification messages for data events associated with the first group that meet at least one of the one or more specified criteria, wherein the request to subscribe specifies the particular event identifier as a starting point of data events for which to send the notification messages.

2. The method of claim 1, further comprising:

subsequent to sending the request to subscribe, receiving, by the streaming server system, a plurality of notification messages for a plurality of data events that meet at least one of the one or more specified criteria, wherein the plurality of data events are associated with respective event identifiers that are subsequent to the particular event identifier.

3. The method of claim 2, wherein one or more of the plurality of notification messages correspond to data events that occurred during the transfer of messages for past data events of the first group associated with the bulk data extraction.

4. The method of claim 1, further comprising:

prior to sending the first request, sending, by the streaming server system to the data storage system, a request to subscribe to a first channel;

wherein sending the first request includes publishing an empty message to the first channel, and wherein the first notification message is received in response to the publishing the empty message.

5. The method of claim 4, further comprising:

in response to receiving the first notification message that includes the particular event identifier, sending, by the streaming server system, a second request to unsubscribe from the first channel.

6. The method of claim 1, wherein the data storage system is a multi-tenant computer system configured to provide computing resources to a plurality of tenants, wherein the first group of users corresponds to a first tenant of the plurality of tenants.

7. The method of claim 1, further comprising:

storing, by the streaming server system, data corresponding to the bulk data extraction for the first group in a message queue accessible to an external system.

8. The method of claim 7, wherein the bulk data extraction is initiated in response to a selection by the first group to utilize services provided by the external system.

9. The method of claim 1, further comprising sending, by the streaming server system, data corresponding to the bulk data extraction to an external system authorized by the first group of users.

10. A non-transitory, computer-readable medium having computer instructions stored thereon that are capable of being executed by a streaming server system to cause operations comprising:

sending a first request to a data storage system that is accessible to a plurality of groups of users, wherein the first request is sent prior to initiation of a bulk data extraction for a first group of the plurality of groups, wherein the bulk data extraction is a transfer of messages for past data events of the first group that meet one or more specified criteria;

in response to the first request, receiving, from the data storage system, a first notification message that includes a particular event identifier for a most recent data event generated at the data storage system;

receiving, from the data storage system, those messages associated with the bulk data extraction for the first group; and subsequent to completion of the bulk data extraction, sending, by the streaming server system to the data storage system, a request to subscribe to notification messages for data events associated with the first group that meet at least one of the one or more specified criteria, wherein the request to subscribe specifies the particular event identifier as a starting point of data events for which to send the notification messages.

11. The non-transitory, computer-readable medium of claim 10, wherein the operations further comprise:

subsequent to sending the request to subscribe, receiving a plurality of notification messages for a plurality of data events that meet at least one of the one or more specified criteria, wherein the plurality of data events are associated with respective event identifiers that are subsequent to the particular event identifier.

12. The non-transitory, computer-readable medium of claim 10, wherein the operations further comprise:

prior to sending the first request, sending, by the streaming server system to the data storage system, a request to subscribe to a first channel;

wherein sending the first request includes publishing an empty message to the first channel, and wherein the first notification message is received in response to the publishing the empty message.

13. The non-transitory, computer-readable medium of claim 12, wherein the operations further comprise:

in response to receiving the first notification message that includes the particular event identifier, sending, by the streaming server system, a second request to unsubscribe from the first channel.

14. The non-transitory, computer-readable medium of claim 11, wherein the operations further comprise:

verifying a sequence of the plurality of notification messages relative to those notification messages associated with the bulk data extraction, wherein the verifying is based on sequence numbers specific to the first group that are included in each of the plurality of notification messages.

15. A method, comprising:

receiving, at a data storage system accessible to a plurality of groups of users, a first request from a streaming server system, wherein the first request is received prior to initiation of a bulk data extraction for a first group of the plurality of groups, wherein the bulk data extraction is a transfer of messages for past data events of the first group that meet one or more specified criteria;

in response to the first request, sending, by the data storage system to the streaming server system, a first notification message that includes a particular event identifier for a most recent data event generated at the data storage system;

sending, by the data storage system to the streaming server system, those messages associated with the bulk data extraction for the first group; and receiving, by the data storage system from the streaming server system, a request to subscribe to notification message for data events associated with the first group that meet at least one of the one or more specified criteria, wherein the request to subscribe specifies the particular event identifier as a starting point of data events for which to send the notification messages.

16. The method of claim 15, further comprising:
subsequent to receiving the request to subscribe, sending, by the data storage system to the streaming server system, a plurality of notification messages for a plurality of data events that meet at least one of the one or more specified criteria, wherein the plurality of data events occurred subsequent to a particular data event associated with the particular event identifier.

17. The method of claim 15, further comprising:
prior to receiving the first request, receiving, by the data storage system from the streaming server system, a request to subscribe to a first channel;
wherein the first request includes an empty message published to the first channel; and wherein the sending the first notification message to the streaming server system is in response to the empty message.

18. The method of claim 17, further comprising:
subsequent to sending the first notification message that includes the particular event identifier, receiving, by the data storage system from the streaming server system, a second request to unsubscribe from the first channel.

19. The method of claim 15, wherein the data storage system is a multi-tenant computer system, wherein the first group of users corresponds to a first tenant of the multi-tenant computer system.

20. The method of claim 16, further comprising:
extending, by the data storage system, a retention window for data events associated with the first group in response to a determination that the bulk data extraction exceeds a predefined retention window; and
wherein the sending the plurality of notification message further comprises sending, by the data storage system, notification messages corresponding to all data events within the extended retention window that meet at least one of the one or more specified criteria associated with the first group.

* * * * *